United States Patent Office 3,480,324
Patented Nov. 25, 1969

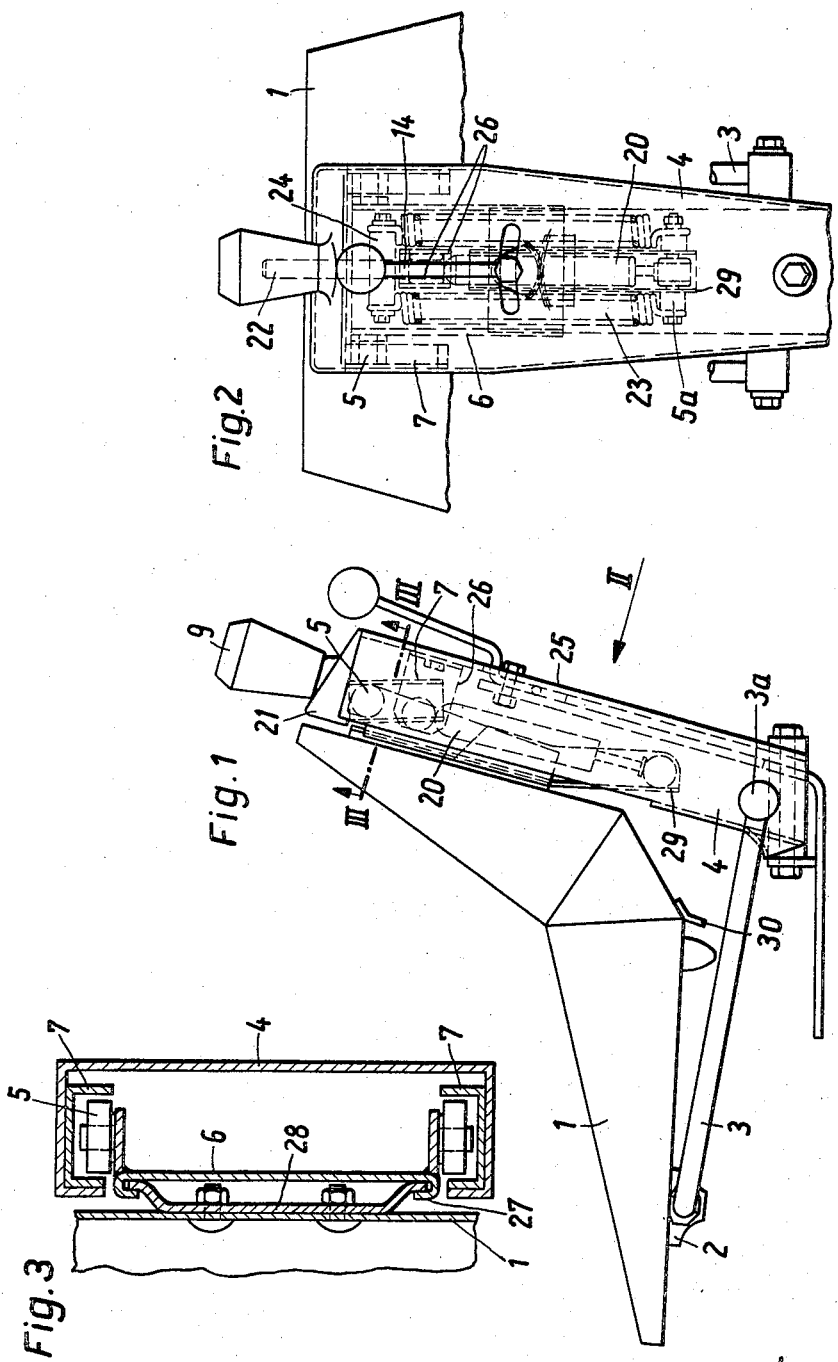

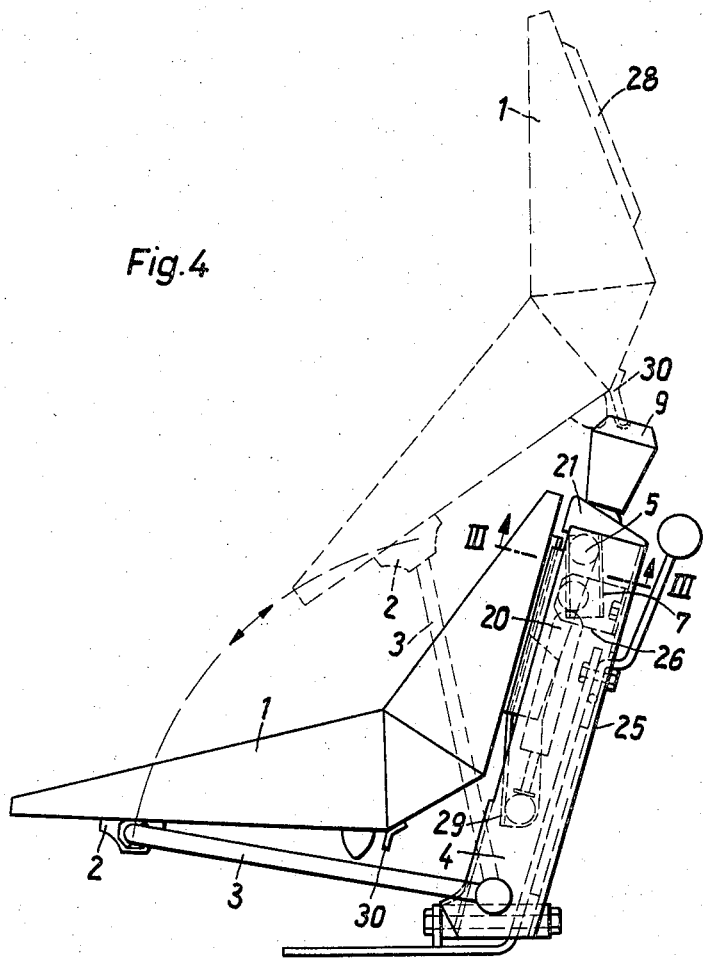

3,480,324
SPRUNG VEHICLE SEATS
Simon Bauer and Josef Wittmann, Bruckmuhl, Germany, assignors to Georg Fritzmeier KG, Grobhelfendorf, Germany
Filed Dec. 27, 1966, Ser. No. 604,755
Int. Cl. B60n 1/02
U.S. Cl. 297—308          6 Claims

ABSTRACT OF THE DISCLOSURE

A seat structure of the type wherein the seat may be displaced to an out of the way position realtive to its normal in-use position, comprising a seat having a first suspension member fixedly mounted therein and slidably engaging a second suspension member which is resiliently suspended from an upright support means, the first suspension member normally being supported by the second one but being upwardly slidable relative thereto in order to become completely disengaged therefrom.

BACKGROUND OF THE INVENTION

Field of the invention

Broadly the invention pertains to an out-of-the-way liftable seating mechanism, wherein the substructure sustaining the seat elastically yields under load to urge the seat towards its non-loaded position, with means to displace the bottom relative to the base, wherein the bottom is pivoted to one end of a rigid arm and the other end of the arm is pivotally mounted to the base.

The present invention is concerned with resiliently supported vehicle seats, more particularly for drivable work machines, such as tractors, of the kind in which the seat is guided with guided rocker arm under the seat cooperating with rollers which run in a backwardly inclined guide column arranged behind the back of the seat.

SUMMARY OF THE INVENTION

The objects of the invention are:

To provide an out-of-the-way liftable seating mechanism for a body equipped with a seating arrangement, to free the space occupied by the seating mechanism for other purposes of the operator, such as entering, standing and similar;

To provide a prebiased resiliency to seating mechanisms which will disconnect automatically on lifting the seating mechanism out of the way.

In conjuction with the above:

To avoid the horizontal components to the vibratory movement of the seat being uncomfortable to the driver and to provide nevertheless a backwardly inclined sliding position to the seat.

The rollers run in a vertical path in the guide column and the guided rocker arm, linked below on the guide column and linked at the front to the seat, performs, when the seat is occupied, a vibratory movement substantially parallel to the path of movement of the rollers. In spite of the optical impression of an inclined guiding, in the arrangement, the seat moves entirely in a substantially vertical path.

When the vehicle seat has on the back of a horizontal axis, a roller on each end and if the guide column has a substantially U-shaped profile to the seat, then vertical U-shaped runners, with the open sides facing one another, may be provided as roller guides, expediently on the opposite bar side of the guide column. These roller guides advantageously lie so far apart that, between them, there can be arranged the spring mechanism having by two helical springs parallel to the axis of the guide column, supported on the seat or on the guide column. A damper may be mounted between the springs. For reasons of saving material, as well as saving space, the guide column is downwardly conically tapered below the roller guide.

The roller holding means is expediently constructed in the form of a slide which, with releasable key seat, fits into a slide guide on the rear side of the back of the seat. The helical springs and the vibration damper can thereby be supported below on an extension of the roller holding means.

It is hereby possible to release the seat from the roller holding means by lifting it up and tilting it horizontally. This possibility of tilting is especially desirable for tractors and combined harvesters since it simplifies getting into the seat. Furthermore, by tilting the seat in an unoccupied open vehicle, the collection of water in the seat can be prevented.

In order that the present invention may be more readily understood, reference is made to the accompanying drawings which illustrate diagrammatically and by way of example, one embodiment thereof. In the accompanying drawings, other objects and many of the attendant advantages of this invention will become apparent to those skilled in the art from the following.

DESCRIPTION OF THE DRAWINGS

FIG. 1 is a side view of a driving seat according to the invention showing the seating arrangement in dotted lines also in the out-of-the-way lifted position;

FIG. 2 is a partial rear view of the seat according to FIG. 1 in the direction of the arrow II;

FIG. 3 is a section along the line III—III of FIG. 1; and

FIG. 4 is a view same as that of FIG. 1 showing the seat shell also lifted into its out-of-the-way upward tilted position.

DESCRIPTION OF THE PREFERRED EMBODIMENT OF THE INVENTION

Referring now to FIG. 1, the seat shell 1 is connected below at 2 with a guide rocker arm 3, which is arranged with its other end linked to the foot of a rearwardly inclined guide column 4 arranged behind the seat shell. The guide column 1 is of U-shaped profile, open to the seat, over substantially the whole of its height, the seat shell being guided upwardly with the aid of two spaced rollers 5 which are mounted on the ends of a bracket 6. The rollers are guided in vertically-arranged U-shaped runners 7 secured to the opposite sides of the guide column 4, with the open sides of the runners facing one another. By virtue of the vertical arrangement of the runners 7, the pivot 2 performs a vibratory movement substantially parallel to the path of movement of the rollers 5, when the seat is occupied.

In the region of the roller guiding, the guide column 4 is broadly constructed and then tapers downwardly. This permits the rollers 5 to be spaced apart sufficiently wide to enable the spring mechanism to be accommodated intermediate the roller guiding. The spring mechanism comprises two helical springs 23, parallel to one another, and a vibration damper 20 therebetween which is supported above in the guide column 4 and is supported below directly on the driving seat. The spring mechanism is suspended above on a stirrup 24, to which is connected a screw jack 22 projecting through an upper closure lid 21 of the guide column 4, on which can be screwed a screw cap 9 above the lid. Rotation of the cap 9 alters the pre-stressing of the helical springs 23. The vibration damper 20 is held above between two fishplates 26 fixed on a flange 25 of the guide column 4.

The bracket 6 of the rollers 5 (see FIG. 3) is in the form of a slide which, with its lateral guides 27, is held for sliding movement in a slide guide 28 secured to the rear side of the seat shell 1. As seen in FIGS. 1, 2 and 4, the guides 27 include a downwardly extending extension 29 on which is supported the lower end of the vibration damper 20, as well as the springs 23. Thus, the seat shell 1 is only connected via the slide guiding with the whole springing and dampening arrangement. Upon lifting the seat shell, the movement of the pivot on the link attached to the seat portion 2, occurs on an arc section which is substantially parallel to the side guide 27, while the bracket also pivots about the rollers 5. It is thus possible to release the seat shell 1 from the bracket 26 by lifting it up and disengaging the guides 27 from the bracket 26 as shown in FIG. 4. The seat shell can then be tilted upwards and hooked in the tilted position to the outer frame of the guide column 4 or the cap 9 by means of a hook 30 provided on its lower side.

What we claim is:

1. A yieldable seat structure having a fixed support portion and a seat portion which is movably mounted on said support portion between an in-use position in which said seat portion extends in a generally horizontal direction from said support portion and an out-of-use position in which said seat portion is displaced to an out of the way position relative to said in-use position, said support portion comprising a rigid upright support column which is U-shaped in a plane transverse to its upright axis, the walls of said column defining a housing open at one side, a guide means mounted on said column within said housing and extending generally vertically; said seat portion comprising a generally L-shaped seat having a back extending generally upright from one end of a bottom, said back facing the open side of said housing, an elongate link member having two opposite ends respectively pivotally attached to said seat bottom and to said column, a first slide member fixedly attached to said seat back, a second slide member including a bearing means which is fitted relative to said guide means for up and down sliding movement therealong, said first and second slide members being detachably interconnected together whereby said first slide member is downwardly supported by said second slide member when the seat portion is in said in-use position and whereby said second slide member can be detached from said first slide member to displace said seat portion to said out-of-use position, spring means mounted within said housing and acting upon said second slide member whereby said second slide member is downwardly displaceable against the resilient restraint of said spring means.

2. The seat structure of claim 1, wherein said first and second slide members are interconnected by means of respective cooperatively engaging portions of each slide member which slidingly engage each other in an up and down direction and include stop means for restraining downward displacement of said first slide member relative to said second slide member, said first slide member being freely displaceable upwardly relative to said second slide member to become completely disengaged therefrom.

3. The seat structure of claim 1, said spring means comprising a compression type spring having one end thereof attached to a part which is rigidly integral with said second slide member and the opposite end thereof is attached to a rigid part mounted on said column.

4. The seat structure of claim 1, wherein said guide means comprises a guide rail along each side of said column within said housing, said spring means being located intermediate of said rails, said second slide member including two said bearing means, respectively associated with a corresponding one of said rails, said rails, bearing means, and spring means being entirely fitted within said housing.

5. The seat structure of claim 3, including a dampening means acting upon said second slide member to dampen up and down oscillations thereof, said dampening means having opposite ends which are respectively attached to the same said parts to which said spring ends are attached.

6. The seat structure of claim 5, including an adjustment means for changing the position of said rigid part relative to said column whereby the setting of said spring means and said dampening means is variable simultaneously through a single actuation of said adjustment means.

References Cited
UNITED STATES PATENTS

| 1,767,757 | 6/1930 | Harris | 297—309 XR |
|---|---|---|---|
| 2,629,427 | 2/1953 | McIntyre | 248—400 XR |
| 3,116,091 | 12/1963 | Bethoon et al. | 297—334 XR |
| 3,291,525 | 12/1966 | Fritzmeier | 297—308 |
| 3,326,603 | 6/1967 | Lehner | 297—308 |

FOREIGN PATENTS 349,867  6/1931  Great Britain.

FRANCIS K. ZUGEL, Primary Examiner

U.S. Cl. X.R.

248—376, 399; 297—334